US008279849B2

(12) United States Patent
Tamai

(10) Patent No.: US 8,279,849 B2
(45) Date of Patent: Oct. 2, 2012

(54) PROPAGATION DELAY TIME ADJUSTMENT METHOD, PROPAGATION DELAY TIME ADJUSTMENT SYSTEM, PROPAGATION DELAY TIME ADJUSTMENT DEVICE, STORAGE MEDIUM STORED WITH PROPAGATION DELAY TIME ADJUSTMENT PROGRAM, AND NODE DEVICE

(75) Inventor: Hideaki Tamai, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 406 days.

(21) Appl. No.: 12/654,065

(22) Filed: Dec. 9, 2009

(65) Prior Publication Data
US 2010/0150178 A1 Jun. 17, 2010

(30) Foreign Application Priority Data

Dec. 12, 2008 (JP) ................................ 2008-316923

(51) Int. Cl.
*H04J 3/06* (2006.01)
(52) U.S. Cl. ....................................................... 370/350
(58) Field of Classification Search .................. None
See application file for complete search history.

(56) References Cited

U.S. PATENT DOCUMENTS

| 4,873,683 | A | * | 10/1989 | Borth et al. ............... 370/337 |
| 5,216,717 | A | * | 6/1993 | Bourcet et al. ................ 381/3 |
| 6,667,966 | B2 | * | 12/2003 | Mitsume et al. ............ 370/350 |
| 2003/0103488 | A1 | * | 6/2003 | Mitsume et al. ............ 370/350 |

FOREIGN PATENT DOCUMENTS

JP 2007-158585 A 6/2007

* cited by examiner

*Primary Examiner* — Hassan Phillips
*Assistant Examiner* — Prenell Jones
(74) *Attorney, Agent, or Firm* — Rabin & Berdo, P.C.

(57) ABSTRACT

There is provided a propagation delay time adjustment method for adjusting the propagation delay time occurring within a reception circuit for each channel of a center node device configuring a 1-to-N communications system in which communication is performed between the center node device and N (N being an integer of 2 or more) individual edge node devices using a Synchronous Code Division Multiplexing method, the center node device comprising a main control section, and each of the edge node devices comprising an auxiliary control section that controls the propagation delay time in cooperation with the main control section, the transmission delay time adjustment method comprising: transmission permission signal transmitting; transmission controlling; reception phase controlling; reception validity determining; optimum reception phase determining; and reception phase setting in which the main control section sets the optimum reception phase as the reception phase for the reception circuit.

5 Claims, 11 Drawing Sheets

PROPAGATION DELAY TIME ADJUSTMENT METHOD, PROPAGATION DELAY TIME ADJUSTMENT SYSTEM, PROPAGATION DELAY TIME ADJUSTMENT DEVICE, STORAGE MEDIUM STORED WITH PROPAGATION DELAY TIME ADJUSTMENT PROGRAM, AND NODE DEVICE

CROSS-REFERENCE TO RELATED APPLICATION

This application is based on and claims priority under 35 USC 119 from Japanese Patent Application No. 2008-316923 filed on Dec. 12, 2008, the disclosure of which is incorporated by reference herein.

BACKGROUND

1. Technical Field

The present invention relates to a propagation delay time adjustment method, a propagation delay time adjustment system, a propagation delay time adjustment device, a storage medium stored with a propagation delay time adjustment program, and a node device. The present invention is, for example, applicable as a method for performing time adjustment in a reception circuit in a first side communication device in an access network employing synchronous CDM (Code Division Multiplexing).

2. Related Art

Access network systems employing Code Division Multiplexing (CDM) are capable of multiplexing plural transmission signals with the same clock time, and have the characteristics of being able to perform data communication with large amounts of data, while also saving on communication resources, such as frequencies, time slots and the like.

In particular, in so-called synchronous types of CDM, the phase of coded signals that have been coded with different codes must be made to match. This is called code synchronization.

An access network system performs communication between a single exchange side device and N individual subscriber devices. Usually the transmission path lengths between the exchange side device and the respective subscriber side devices are different from each other. Therefore, in order to perform code synchronization (called uplink synchronization) in uplink communication (communication from the subscriber side toward the exchange side), an operation (called ranging) is required to correct misalignment in phase occurring due to the differences in transmission path length.

A method of performing such ranging is described in Japanese Patent Application Laid-Open (JP-A) No. 2007-158585. The ranging method described in JP-A No. 2007-158585 is the following technique.

In a 1-to-N communications system, a center node (exchange side device) fixes the reception phase during ranging processing. Then a transmission permission signal in which the transmission phase is indicated is repeatedly transmitted to the edge node device (subscriber side device) that is to be subjected to synchronization establishment, with the transmission phase changed in the transmission permission signal on each of the repetitions. The edge node device, when it has received the transmission permission signal, transmits a transmission signal for use in synchronization establishment, the transmission signal including a fixed signal, at the transmission phase incorporated within the received transmission permission signal.

Then center node device then determines whether or not the signal of this transmission phase has been validly received, based on a spreading demodulation output signal for a fixed signal period in the signal received from the edge node device, determines the optimum transmission phase of valid reception within an oscillated range of the transmission phase, and notifies this to the edge node device. This is a technique that, by the above, the edge node device sets the transmission phase to this optimum transmission phase when the edge node device has received the optimum transmission phase.

As stated above, since each of the transmission path distances between the exchange side device and the respective subscriber side devices are different, a difference in the transmission time of the transmission signals occurs. Consequently, it is necessary for the difference in transmission time of the transmission signals to be corrected by the above ranging processing.

However, in carrying out the above ranging processing, in order to realize a state in which all of the transmission signals for each of the respective channels are aligned (code synchronization), the following two conditions must first be satisfied.

Condition 1: the difference in the transmission time from the divider 49 in the exchange side device 2 to the gate section 45-$n$ in each of the reception sections 40-$n$ (called the reception skew) being zero (see FIG. 3 and FIG. 4 of JP-A No. 2007-158585).

Condition 2: the difference in the transmission time from the clock generator 44 to the gate section 45-$n$ in each of the reception sections 40-$n$ (called the mail clock skew) being zero (see FIG. 4 of JP-A No. 2007-158585).

Skew is simply used as a collective term for this reception skew and main clock skew. This skew is inherent to the reception configuration of the exchange side device 2.

Consequently, in order to make this skew zero, for example, adoption could be considered of a configuration in which a skew adjustment signal generator that generates a skew adjustment signal is disposed in the exchange side device 2 and the skew adjustment signal is input to the divider 49, so as to adjust the skew by identifying the transmission time difference of each of the channels. By so doing, the skew can be adjusted at the exchange side device 2 alone.

However, since the skew of each of the respective reception sections 40-$n$ needs to be adjusted, an extremely complicated configuration is required with provision of many components, and constructing such an exchange side device 2 is extremely difficult.

Therefore, a propagation delay time adjustment method, a propagation delay time adjustment system, a propagation delay time adjustment device, a storage medium stored with a propagation delay time adjustment program, and a node device are desired that can, by employing a conventional device configuration and network configuration, adjust the skew and establish code synchronization with certainty.

SUMMARY

In order to address the above issues, a first aspect of the present invention provides a propagation delay time adjustment method for adjusting the propagation delay time occurring within a reception circuit for each channel of a center node device configuring a 1-to-N communications system in which communication is performed between the center node device and N (N being an integer of 2 or more) individual edge node devices using a Synchronous Code Division Multiplexing method, the center node device comprising a main control section that sequentially adjusts the propagation delay times occurring within the reception circuit for each of the channels one-by-one, and each of the edge node devices comprising an auxiliary control section that controls the propagation delay time in cooperation with the main control section, the transmission delay time adjustment method comprising:

transmission permission signal transmitting in which the main control section transmits a transmission permission signal in which a spreading code has been specified for the edge node device;

transmission controlling in which, when the transmission permission signal is received, the auxiliary control section repeatedly transmits a sync signal that has been coded using the spreading code;

reception phase controlling in which the main control section changes a reception phase of the reception circuit corresponding to the edge node device;

reception validity determining in which, for a fixed signal period in a reception signal from the edge node device, the main control section determines whether or not a signal has been validly received based on a spreading demodulation output signal from the reception circuit;

optimum reception phase determining in which the main control section determines the optimum reception phase for which valid reception can be made within an oscillated range of the reception phase; and reception phase setting in which the main control section sets the optimum reception phase as the reception phase for the reception circuit.

A second aspect of the present invention provides a propagation delay time adjustment system for adjusting the propagation delay time occurring within a reception circuit for each channel of a center node device configuring a 1-to-N communications system in which communication is performed between the center node device and N (N being an integer of 2 or more) individual edge node devices using a Synchronous Code Division Multiplexing method, the center node device comprising a main control section that sequentially adjusts the propagation delay times occurring within the reception circuit for each of the channels one-by-one, and each of the edge node devices comprising an auxiliary control section that controls the propagation delay time in cooperation with the main control section, wherein:

the main control section comprising a transmission permission signal transmission section that transmits a transmission permission signal in which a spreading code has been specified for the edge node device;

the auxiliary control section comprising a transmission control section that, when the transmission permission signal is received, repeatedly transmits a sync signal that has been coded using the spreading code;

the main control section comprising:

a reception phase control section that changes a reception phase of the reception circuit corresponding to the edge node device;

a reception validity determining section that, for a fixed signal period in a reception signal from the edge node device, determines whether or not a signal has been validly received based on a spreading demodulation output signal from the reception circuit;

an optimum reception phase determining section that determines the optimum reception phase for which valid reception can be made within an oscillated range of the reception phase; and a reception phase setting section that sets the optimum reception phase as the reception phase for the reception circuit.

A third aspect of the present invention provides a propagation delay time adjustment device for adjusting the propagation delay time occurring within a reception circuit for each channel of a center node device configuring a 1-to-N communications system in which communication is performed between the center node device and N (N being an integer of 2 or more) individual edge node devices using a Synchronous Code Division Multiplexing method, the center node device comprising a main control section that sequentially adjusts the propagation delay times occurring within the reception circuit for each of the channels one-by-one, wherein the main control section comprising:

a transmission permission signal transmission section that transmits a transmission permission signal in which a spreading code has been specified for the edge node device;

a reception phase control section that changes a reception phase of the reception circuit corresponding to the edge node device;

a reception validity determining section that, for a fixed signal period in a reception signal from the edge node device, determines whether or not a signal has been validly received based on a spreading demodulation output signal from the reception circuit;

an optimum reception phase determining section that determines the optimum reception phase for which valid reception can be made within an oscillated range of the reception phase; and a reception phase setting section that sets the optimum reception phase as the reception phase for the reception circuit.

A fourth aspect of the present invention provides a storage medium stored with a propagation delay time adjustment program for adjusting the propagation delay time occurring within a reception circuit for each channel of a center node device configuring a 1-to-N communications system in which communication is performed between the center node device and N (N being an integer of 2 or more) individual edge node devices using a Synchronous Code Division Multiplexing method, the center node device comprising a main control section that sequentially adjusts the propagation delay times occurring within the reception circuit for each of the channels one-by-one, wherein the program causes the main control section to function as:

a transmission permission signal transmission section that transmits a transmission permission signal in which a spreading code has been specified for the edge node device;

a reception phase control section that changes a reception phase of the reception circuit corresponding to the edge node device;

a reception validity determining section that, for a fixed signal period in a reception signal from the edge node device, determines whether or not a signal has been validly received based on a spreading demodulation output signal from the reception circuit;

an optimum reception phase determining section that determines the optimum reception phase for which valid reception can be made within an oscillated range of the reception phase; and a reception phase setting section that sets the optimum reception phase as the reception phase for the reception circuit.

A fifth aspect of the present invention provides a node device in center node device of a 1-to-N communications system in which communication is performed between the center node device and N (N being an integer of 2 or more) individual edge node devices using a Synchronous Code Division Multiplexing method, the node device comprising the propagation delay time adjustment device of claim 3.

According to the present invention, the propagation delay time (skew) in a reception circuit of a center node device can be adjusted by a simple configuration that employs existing ranging processing. After execution of this skew adjustment procedure, code synchronization can be established with certainty, by performing a conventional example of ranging processing.

BRIEF DESCRIPTION OF THE DRAWINGS

Exemplary embodiments of the present invention will be described in detail based on the following figures, wherein.

DETAILED DESCRIPTION (A) First Exemplary Embodiment

Explanation will now be given below of a propagation delay time adjustment method, a propagation delay time adjustment system, a propagation delay time adjustment device, a storage medium stored with a propagation delay time adjustment program, and a node device of a first exemplary embodiment of the present invention, with reference to the drawings.

(A-1) Configuration of First Exemplary Embodiment

Figure 1:
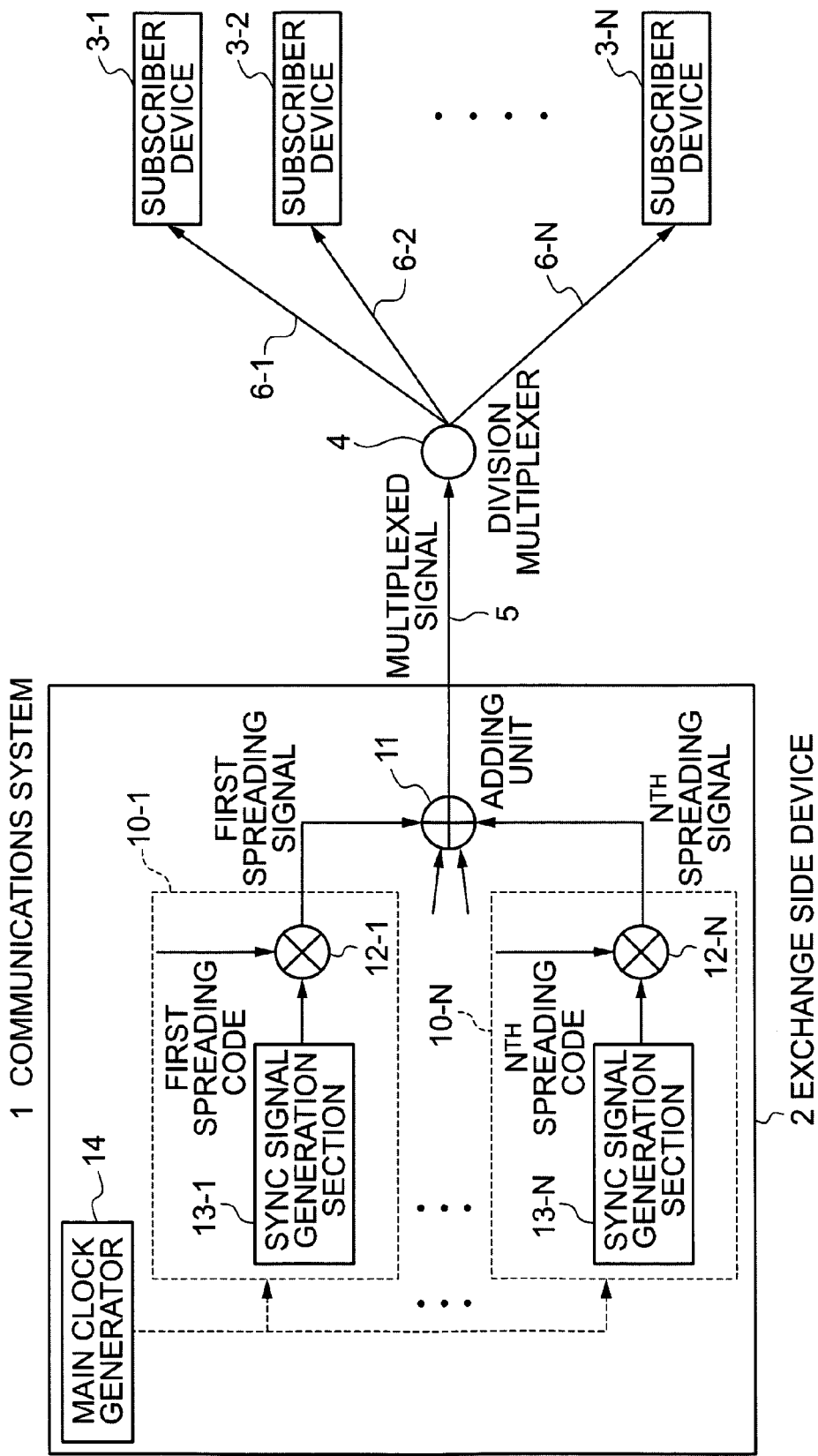
FIG. 1 is a block diagram showing an overall configuration of a communications system of a first exemplary embodiment, and a transmission configuration in an exchange side device.

FIG. 1 is a block diagram showing an overall configuration of a communication system of the first exemplary embodiment, and a transmission configuration in an exchange side device (center node device).

Note that in the following explanation only a configuration relating to synchronization establishment will be described, and explanation relating to the transmission signal of user data will be omitted.

In FIG. 1, a 1-to-N communications system of the first exemplary embodiment (simply referred to below as a communications system) 1 is one that employs a synchronous CDM method and includes: an exchange side device 2; plural (N individual) subscriber devices (edge node devices) 3-1 to 3-N; and a division multiplexer 4. The exchange side device 2 is connected to the division multiplexer 4 via a common communications path 5, and each of the subscriber devices 3-$n$ ($n=1$ to N, this also being the case below) is connected to the division multiplexer 4 via an individual separate transmission path 6-$n$. Namely, the communications system 1 is configured with the exchange side device 2 connected via the division multiplexer 4 to subscriber devices 3-1 to 3-N for N channel divisions.

In FIG. 1, the exchange side device 2 includes, as a transmission configuration, a single main clock generator 14, transmission sections 10-1 to 10-N for N channel divisions, and a single adding unit 11.

The main clock that the main clock generator 14 generates determines the repeat cycle of the digital signal that the present system transmits and receives. Namely, the present system is synchronized to this main clock.

Each of the transmission sections 10-$n$ has a sync signal generation section 13-$n$ that generates a sync signal, and a spreading section 12-$n$ that spread modulates with a spreading code that is different for each spreading section 12-$n$. Here, for example, a code of an orthogonal Gold code is used as the spreading code employed in spreading modulation, this being good for both autocorrelation characteristics and cross-correlation characteristics. The spreading modulation signal from each of the transmission sections 10-$n$ (referred to below as the spreading signal) is multiplexed by the adding unit 11 and output to the common communications path 5.

Note that while the communications system 1 is one mainly intended for application to optical access systems, since it has the characteristics of a synchronous method, in FIG. 1 and subsequent drawings, an optical-electrical conversion mechanism and an electrical-optical conversion mechanism are omitted in the drawings.

In FIG. 1, the multiplexed signal (downlink signal) from the exchange side device 2 is divided into N individual signals by the division multiplexer 4, and transmitted to the subscriber device 3-$n$ via the individual separate transmission path 6-$n$.

Figure 2:
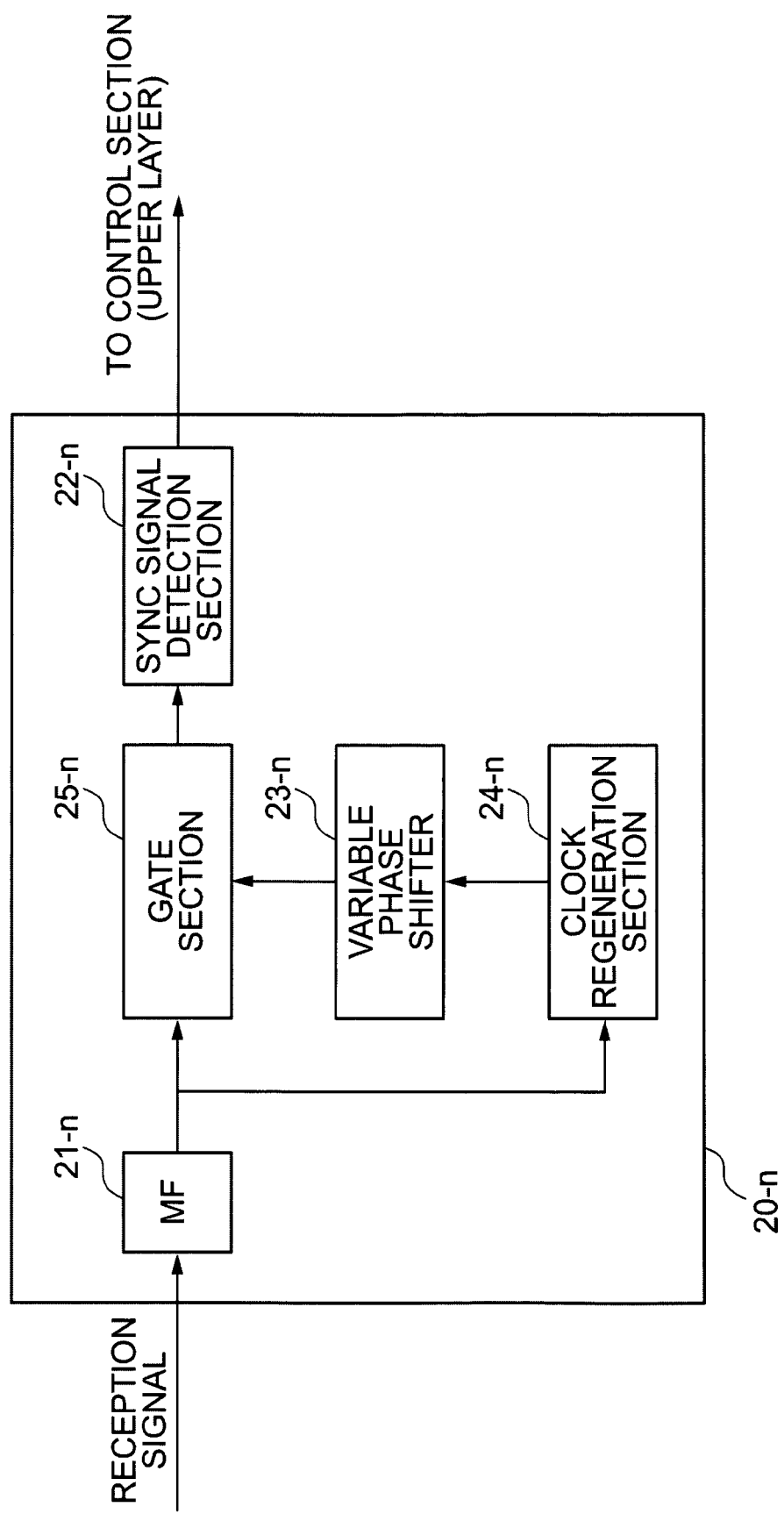
FIG. 2 is a block diagram showing a reception configuration of a subscriber device of the first exemplary embodiment.

FIG. 2 is a block diagram showing a detailed configuration of a reception section in each of the subscriber devices 3-$n$, to which is applied the divided multiplexed signal from the individual separate transmission path 6-$n$.

In FIG. 2, a reception section 20-$n$ of the subscriber device 3-$n$ includes: a matched filter (MF) 21-$n$ that performs spreading code correlation calculations (despreading processing) on the reception signal (multiplexed signal) and generates a correlation output signal for its own channel; a clock regeneration section 24-$n$ that regenerates the main clock from the output of the matched filter 21-$n$; a variable phase shifter 23-$n$ that changes the phase of the main clock; a gate section 25-$n$ that latches the output of the matched filter 21-$n$ to the main clock that has passed through the variable phase shifter 23-$n$; and a sync signal detection section 22-$n$ that detects a sync signal in the output of the gate section 25-$n$.

In the reception section 20-$n$ of the subscriber device 3-$n$, the spreading signal of the opposing exchange side device 2 that corresponds to the transmission section 10-$n$ (a spreading signal for each of the subscribers) is allocated, and the matched filter 21-*n* employs this spreading signal to perform demodulation of the reception signal.

Figure 3:
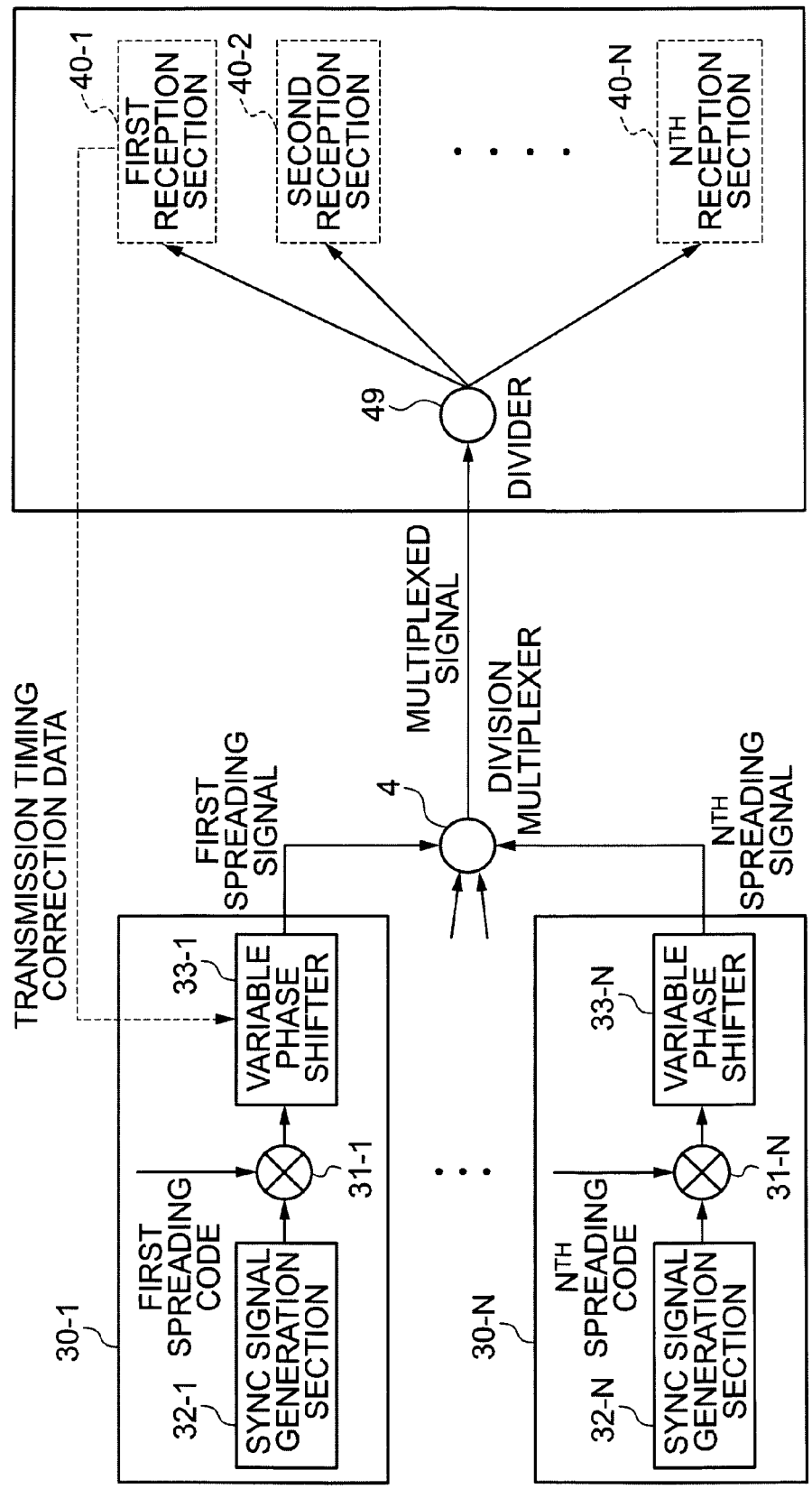
FIG. 3 is a block diagram showing a transmission configuration of a subscriber device of the first exemplary embodiment, and an overall configuration of a communications system with a transmission signal flowing from a transmission section of the subscriber device to an exchange side device.

FIG. 3 shows a detailed configuration of a transmission section of each of the subscriber devices 3-*n*, and the overall configuration of a communications system along which a transmission signal flows from this transmission section to the exchange side device 2.

Each of the subscriber devices 3-*n* is provided with a respective transmission section 30-*n*. The main clock (that has not been subjected to phase shifting) acquired by the clock regeneration section 24-*n* of the reception section 20-*n* described above, is applied to the transmission section 30-*n* of the same subscriber device 3-*n*, and the transmission section 30-*n* synchronizes to this main clock and performs transmission processing.

The transmission section 30-*n* of the subscriber device 3-*n*, as shown in FIG. 3, includes: a spreading modulation section 31-*n* that spread modulates the data signal, formed in synchronization to the clock extracted by the reception section 20-*n*, into a spreading signal specific to each of the subscribers; a sync signal generating section 32-*n* that generates a sync signal and applies it to the spreading modulation section 31-*n*; and a variable phase shifter 33-N that makes fine adjustments to the transmission timing. The variable phase shifter 33-N is, for example, a delay circuit configuration.

The spreading signal transmitted from the subscriber device 3-*n* is multiplexed by the division multiplexer 4 and input to the exchange side device 2.

The exchange side device 2 has, as a reception configuration, a divider 49 and a reception section 40-*n* for each of the channels. The reception signal (multiplexed signal) of the exchange side device 2 is divided into N branches by the divider 49, and input into the reception sections 40-*n* of each of the channels. When the transmission path is an optical fiber, an optical-electrical converter is provided prior to the divider 49, or at the input stage to the reception section 40-*n*.

Figure 4:
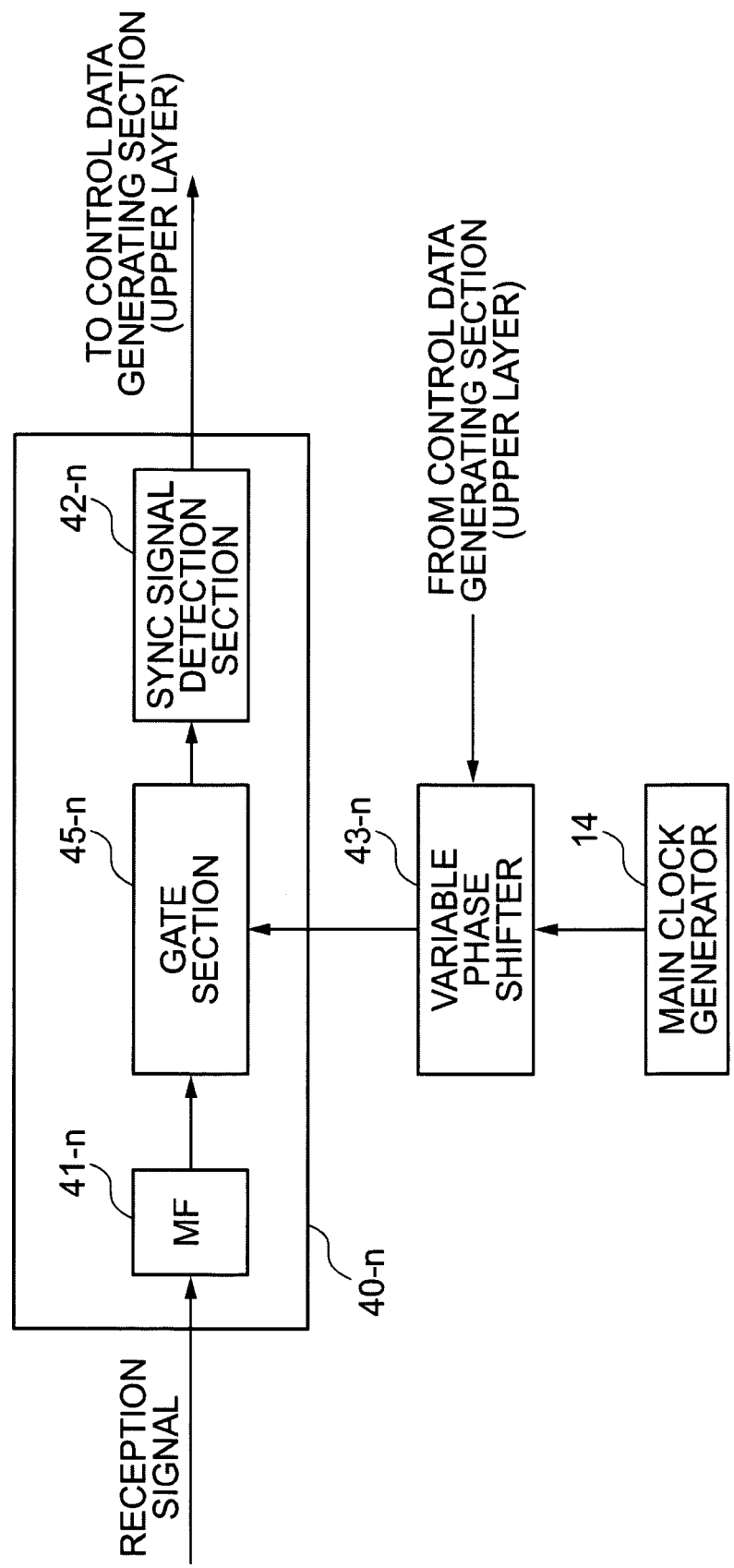
FIG. 4 is a block diagram showing a reception configuration of an exchange side device of the first exemplary embodiment.

FIG. 4 is a block diagram showing a detailed configuration of the reception section 40-*n* of the exchange side device 2, to which the divided signal from the divider 49 is applied.

In FIG. 4, the reception section 40-*n* of the exchange side device 2 includes: a matched filter (MF) 41-*n* that performs correlation calculations between the reception signal (multiplexed signal) and the spreading code (despreading processing), and generates a correlation output signal for the channel; a gate section 45-*n* that latches the output of the matched filter 41-*n* to the main clock output from a variable phase shifter 43-*n*, described later; and a sync signal detection section 42-*n* that detects a sync signal in the output of the gate section 45-*n*.

The variable phase shifter 43-*n* is disposed between the main clock generator 14 and the gate section 45-*n*. The variable phase shifter 43-*n* varies the phase of the main clock generated from the main clock generator 14, in accordance with correction data, described later.

Figure 5:
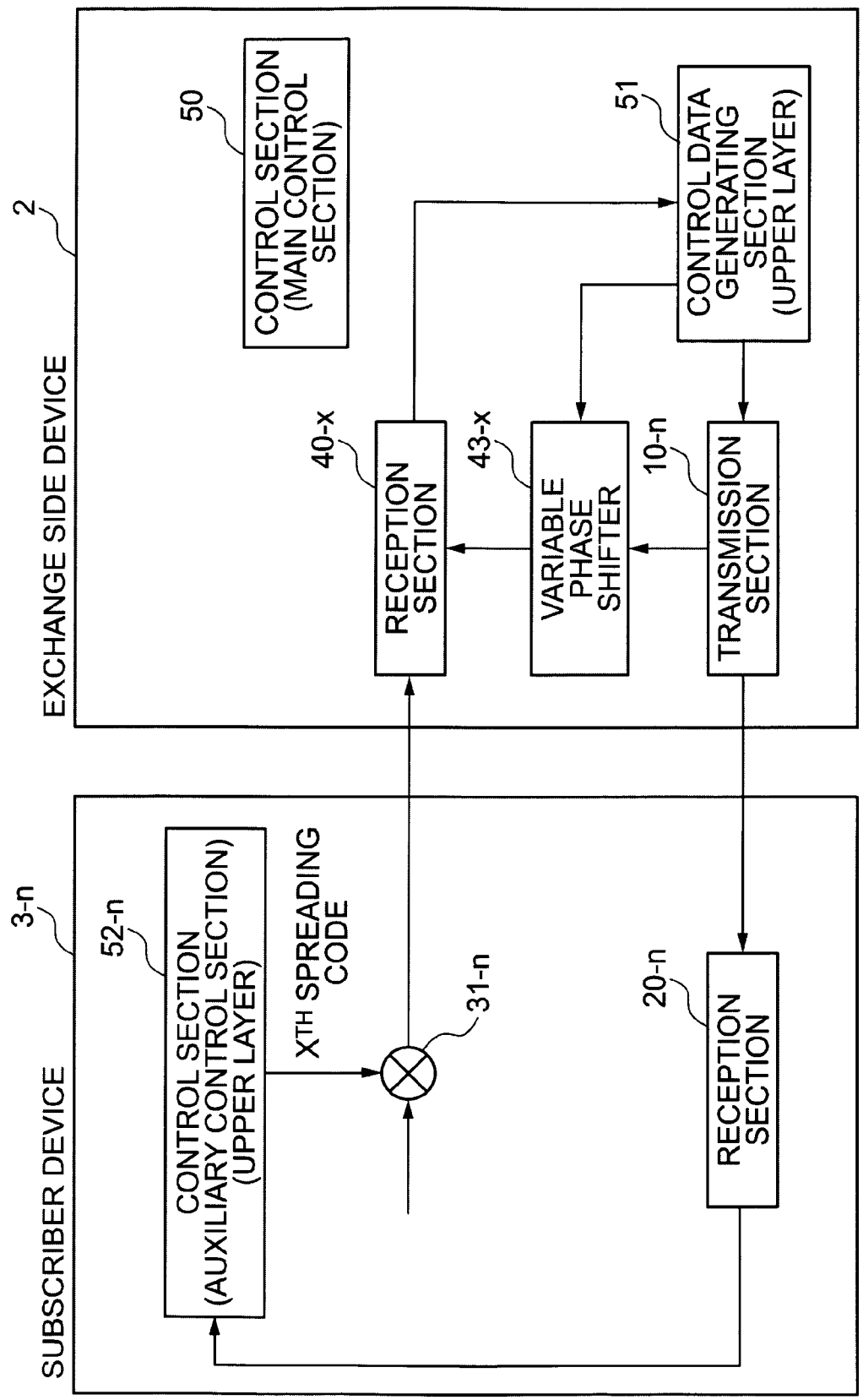
FIG. 5 is a block diagram showing a schematic configuration of each portion functioning during skew adjustment of the first exemplary embodiment.

FIG. 5 is a block diagram showing a schematic configuration of each portion functioning during skew adjustment of the first exemplary embodiment.

In FIG. 5, the exchange side device 2 is equipped with a control section (main control section) 50 that performs successive adjustment control on the skew generated by reception section 40-*x* for each of the channels one-by-one. The control section (main control section) 50 controls a control data generating section 51, the reception section 40-*x*, a variable phase shifter 43-*x*, and the transmission section 10-*n*.

The subscriber device 3-*n* is also equipped with a control section (auxiliary control section) 52-*n* that cooperates with the control section 50 of the exchange side device 2 and performs adjustment control of the skew of the reception section 40-*x*.

In FIG. 5, the exchange side device 2 is also equipped with the control data generating section (reception phase setting section) 51. The control data generating section 51 generates and outputs two categories of data.

The first category of data that the control data generating section 51 generates is code data (transmission signal) designating the spreading code for use in transmission of the subscriber device 3-*n*. The generated code data is applied to the transmission sections 10-*n*, and transmitted to the subscriber device 3-*n* by the transmission sections 10-*n*. This transmission sections 10-*n* is not limited to one functioning to transmit data of the code data and the like, and is equipped with functionality (a transmission permission signal transmission section or the like) to transmit a transmission permission signal in which the spreading code is specified.

The second category of data the control data generating section 51 generates is latch timing correction data for the reception section 40-*x* (where x is an integer from 1 to N). The generated correction data is applied to the variable phase shifter 43-*x* and controls the phase amount (delay amount) of the variable phase shifter 43-*x*. The control data generating section 51, for example, executes communications control in the exchange side device 2, and is formed from components of both software and hardware.

The reception section 20-*n* of the subscriber device 3-*n* receives code data from the transmission section 10-*n*. The code data acquired by the reception section 20-*n* is applied to the control section 52-*n*.

The control section 52-*n* controls the $x^{th}$ spreading code for supply to the spreading modulation section 31-*n*, according to the code data. The control section 52-*n* utilizes the $x^{th}$ spreading code so as to successively repeat transmission of the coded sync signal. In other words, under the control of the control section 52-*x*, the transmission signal from the subscriber device 3-*n* that was coded by the $x^{th}$ spreading code is applied to the exchange side device 2.

When the transmission signal is input to the reception section 40-*x* of the exchange side device 2, the sync signal detection result from the sync signal detection section 42-*n* (not shown in FIG. 5) of an internal portion of the reception section 40-*x* is output, and fed back to the control data generating section 51.

Namely, when the reception section 40-*x* receives the signal from the exchange side device 2, within the reception section 40-*x*, the latch timing of the reception signal is changed by the variable phase shifter 43-*x* by given time periods. Determination is also made as to whether or not the sync signal detection section 42-*n* has been able to spreading demodulate the signal from the individual specific signal of the reception signal and validly receive the signal. The control data generating section 51 then detects the optimal reception phase within the range the individual specific signal can be detected, and sets the reception phase of the reception section 40-*x* thereto.

(A-2) Operation of the First Exemplary Embodiment

Explanation will now be given of the operation of the communications system 1 of the first exemplary embodiment, split into the normal transmission operation, the skew adjustment operation, and the synchronization establishment operation after this skew adjustment.

(A-2-1) Normal Communication Operation

First explanation will be given of the normal transmission operation from the exchange side device 2 to the subscriber device 3-$n$. In this normal transmission operation, synchronization as a system has already been established for each of the subscriber devices 3-$n$.

In the exchange side device 2, each respective transmission sections 10-$n$ for each channel generates a sync signal for its own channel, and after spreading modulation by the spreading code of its own channel, the obtained modulation signal (spreading signal) of each of the channels is multiplexed by the adding unit 11 and transmitted out to the common communications path 5.

Figure 6:
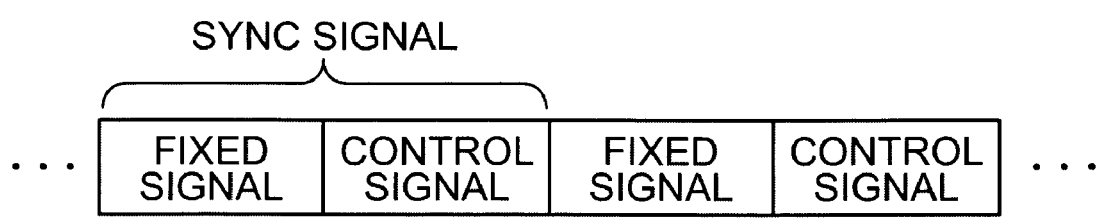
FIG. 6 is an explanatory diagram showing a configuration of a communications signal between an exchange side device of the first exemplary embodiment and a subscriber device.

FIG. 6 is an explanatory diagram showing a configuration of a communications signal for sending and receiving between the exchange side device 2 and a given subscriber device 3-$n$. Note that the configuration of the communications signal is the same in both the uplink and the downlink directions.

The communications signal is configured by repeating the sync signal of fixed length. The sync signal is divided into a fixed signal and a control signal. The fixed signal is a bit string of a predetermined pattern, and is employed such that the receiving side detects the beginning position of the frame, and for synchronization establishment, as will be described later. The control signal is a control signal for the exchange side device 2 to control the transmission section 30-$n$, and the subscriber device 3-$n$ reads out the control signal for control within the device itself The control signal is also used when the subscriber device 3-$n$ sends a control reply back to the exchange side device 2.

The output signal (multiplexed signal) from the exchange side device 2 is divided into N branches by the division multiplexer 4, and these are applied to each of the subscriber devices 3-$n$.

Each of the subscriber devices 3-$n$ performs despreading processing on the reception signal using the spreading code allocated to its own channel, and generates a phase output signal (MF output signal) for its own channel. This MF output signal is input to the clock regeneration section 24-$n$, and the clock regeneration section 24-$n$ regenerates the main clock (for example, forms the main clock by employing a PLL circuit to perform a phase comparison of the MF output signal and its own local oscillator output). The reception data is determined by the gate section 25-$n$ latching the MF output signal to the main clock.

Explanation will now be given of the principle of the spreading modulation and despreading processing to which the first exemplary embodiment is applied, with reference to FIG. 7.

Figure 7:
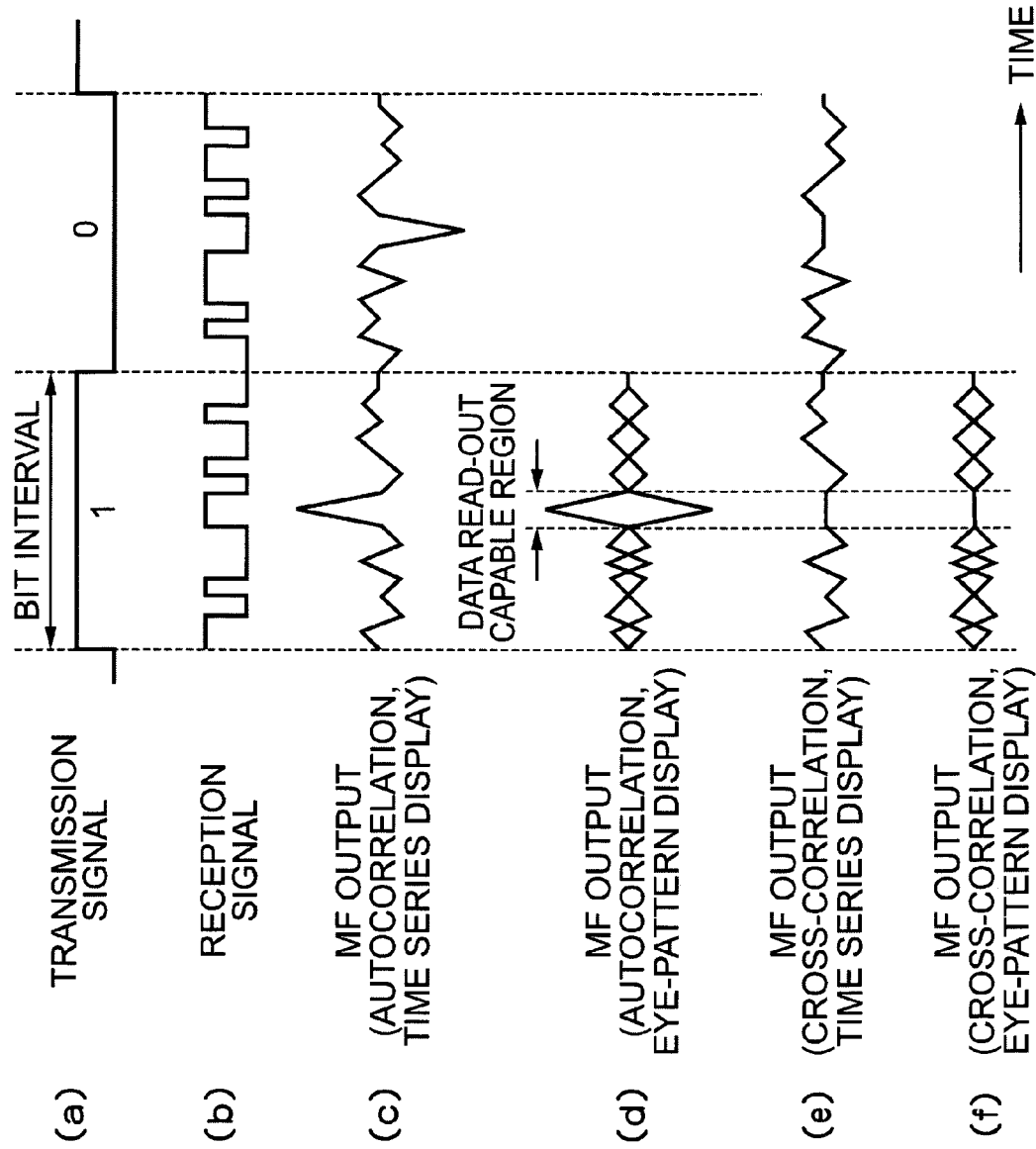
FIG. 7 is an explanatory diagram of the principles of spreading modulation and despreading processing of the first exemplary embodiment.

Spreading modulation refers to an operation that employs a specific bit string to convert each bit of the signal (digital signal) desired for transmission into a pattern having a shorter interval than the bit interval of the signal desired for transmission (the operation to convert from FIG. 7($a$) to FIG. 7($b$)). The specific bit string employed for conversion is called the spreading code, and the spreading code is unique for every one of the channels. A bit inversion code is used, for example, when spreading the "1's" and "0's" of the signal desired for transmission. When the spreading signal after spreading modulation is despread with the same code (carrying out autocorrelation), a strong positive or negative peak appears in every one of the bit intervals (FIG. 7($c$) and FIG. 7($d$)). The transmitted signal can be read out by applying threshold value processing at the phase position where these peaks appear. However, when despread with a different code (carrying out cross-correlation), peaks like those of autocorrelation do not appear (FIG. 7($e$) and FIG. 7($f$)). In particular, when the codes employed for spreading are of an orthogonal code series, a no noise state (MF output signal (correlation output)=0) occurs at the phase position where peaks appear in autocorrelation. Even when plural spreading signals modulated with different spreading codes are multiplexed in the above manner, the transmitted signal can be restored at the reception side (despreading processing side) without mutual interference with each other.

The extracted sync signal is applied to the control section 52-$n$ of the upper layer of the subscriber device 3-$n$, and employed during synchronization establishment.

The subscriber device 3-$n$ also generates a sync signal for its own channel, and, after performing spreading modulation with the spreading code for its own channel, performs transmission.

The modulated signals from each of the subscriber devices 3-$n$ (spreading signals), are input to the exchange side device 2 after being multiplexed by the division multiplexer 4.

In the exchange side device 2, the reception signal (multiplexed signal) is divided into N branches by the divider 49, and these are input to the reception sections 40-$n$ for each of the channels.

Each of the reception sections 40-$n$ performs despreading processing on the reception signal using the spreading code allocated to its own channel, and generates a correlation output code (MF output signal) for its own channel. The gate section 45-$n$ determines the received data by latching the MF output signal to the main clock.

The sync signal detection section 42-$n$ captures any phase displacement between the phase of the sync signal and the local phase, applies phase displacement data to the control section of the upper layer that has the role of functioning as the control data generating section 51, and uses the phase displacement data in ranging, as described later, or the like.

(A-2-2) Operation of Skew Adjustment Method

Explanation will now be given regarding operation of the skew adjustment method of the first exemplary embodiment, with reference to FIG. 8.

Figure 8:
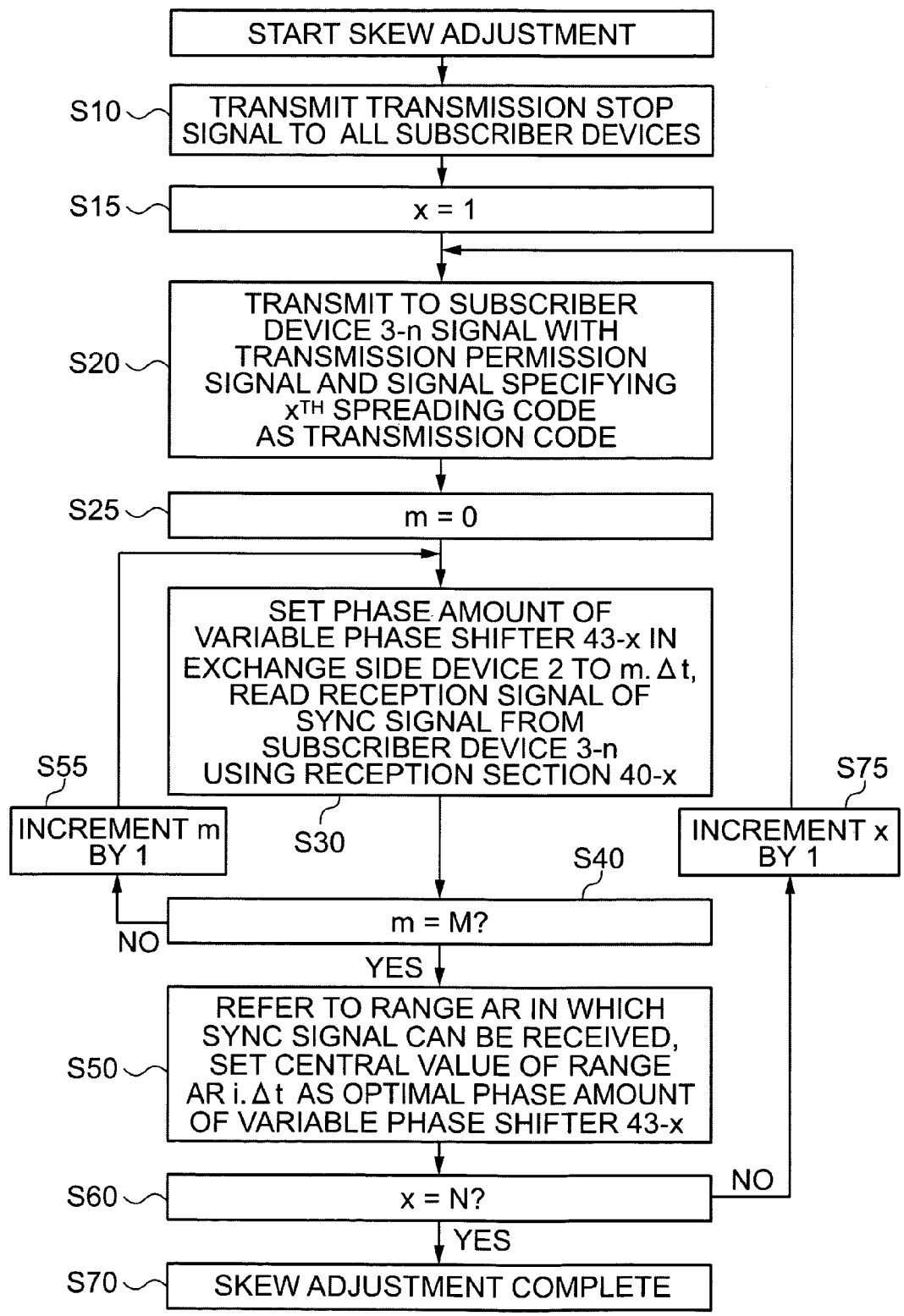
FIG. 8 is a flow chart for explaining the operation of the skew adjustment method in the reception section of the exchange side device of the first exemplary embodiment.

FIG. 8 is a flow chart showing operation of the skew adjustment method of the first exemplary embodiment. The skew adjustment method of the first exemplary embodiment is configured to include a first to a seventh step, and hence explanation will be given of the processing contents for each of the steps in turn from the first step.

The first step S10 is a step in which respective transmission stop signals are transmitted from the exchange side device 2 to all of the respective subscriber devices 3, and all of the subscriber devices 3 are placed in a standby state. By receiving the transmission stop signals, each of the subscriber devices 3 is placed in a state in which reception of downlink signals is possible, but transmission of uplink signals cannot be performed.

The second step S20 is a step in which signals, a transmission permission signal and a signal specifying the $x^{th}$ spreading code as the transmission code, are transmitted from the exchange side device 2 to the subscriber device 3-$n$. Here n is any integer from 1 to N. x is an integer from 1 to N, with the initial value thereof being 1 (step S15). This x corresponds to the channel that is to be the subject of skew adjustment. On receipt of these two signals, the subscriber device 3-$n$ codes the sync signal using the $x^{th}$ spreading code, and starts transmission to the exchange side device 2.

Figure 9:
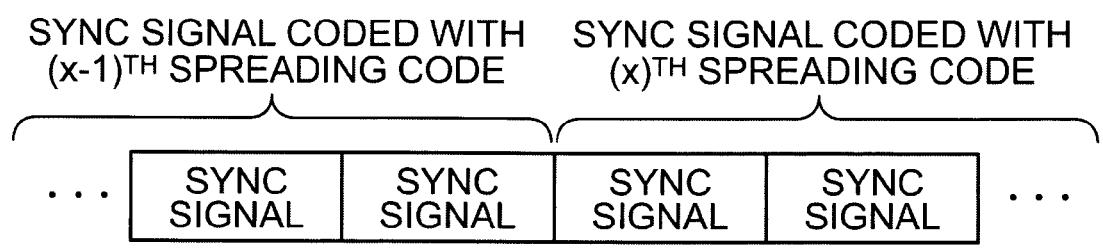
FIG. 9 is an explanatory diagram for explaining the transmission timing of a sync signal of the first exemplary embodiment.

The second step S20 is sometimes executed in succession to step S75, described later. When this is the case, the subscriber device 3-$n$ is in a state in which the sync signal that has been coded using the $(x-1)^{th}$ spreading code is being continuously transmitted. In this state, if the signal specifying the $x^{th}$ spreading code as the transmission code is received, as shown in FIG. 9, it is important that there is never a gap at the position where the signal changes, and that the sync signal continues to always be transmitted with the same cycle.

The third step S30 is a step in which reception is attempted, of the sync signal that has been transmitted from the subscriber device 3-n at second step S20, using the reception section 40-x in the exchange side device 2. When this occurs, the phase amount of the variable phase shifter 43-x is set as m*Δt, where m is an integer of 0 to M and Δt is the phase step amount.

The relationship shown in Equation (1) is held between the maximum value M of the variable m, the phase step amount Δt, and the bit interval in the data signal.

$$M*\Delta t = \text{bit interval} \tag{1}$$

The fourth step S40 is a step in which determination is made as to whether or not the value of the variable m explained in the third step S30 is equivalent to M.

The fifth step is a step including S50 and S55 shown in FIG. 8. When determination is made that the conditions of the fourth step are true then the routine proceeds to step S50, and when determined false the routine proceeds to step S55.

Step S55 is a step in which the variable m is incremented by 1. After this the routine returns to the third step S30.

The reason for the loop of steps S30, S40 and S55 is to change the timing (phase amount of the main clock), for latching the reception signal using the reception section 40-x, in the series 0, 1*Δt, 2*Δt, . . . , M*Δt, and to determine whether or not the sync signal can be received at each of the latch timings. After the M+1 times of determination have all been completed, the routine proceeds to step S50.

In step S50, the optimum phase amount is set by considering a range AR in which the fixed signal obtained by executing the above loop can be detected (see FIG. 10), and setting the optimum phase amount to be the value i*Δt that is the center of the range AR. The control data generating section 51 sets the phase amount of the variable phase shifter 43-x to this optimal phase amount, and establishes (fixes) the reception timing. The skew adjustment of the reception section 40-x is completed by execution of the above steps.

The sixth step S60 is a step in which determination is made as to whether or not the variable x is equivalent to N. Namely, determination is made as to whether or not the skew adjustment of all of the reception sections 40 has been completed.

The seventh step includes step S70 and step S75 shown in FIG. 8. When determination is made that the conditions of the sixth step are true then the routine proceeds to step S70 and the skew adjustment of all of the reception sections 40 is completed. When determined false the routine proceeds to step S75, and the value of the variable x is incremented by 1. After this the routine returns to the second step S20, and skew adjustment of the next reception section is executed.

(A-2-3) Synchronization Establishment Operation

Explanation will next be given of the synchronization establishment operation (ranging) performed after performing skew adjustment for each of the channels in the reception circuits of the exchange side device 2. The synchronization establishment operation is, in the main, performed centered around the control sections of the transmission sections and upper layer of the reception section.

Here, ranging means synchronization of the phases of the transmission signals from all of the subscriber devices 3-1 to 3-N. Ranging is processing to correct a difference that occurs in the transmission time of data (transmission signals) due to the transmission path distances, from the exchange side device 2 to the subscriber device 3-n, being different for each of the subscriber devices 3-n.

Initially, a control section (not illustrated) of the exchange side device 2 transmits a communication stop command (transmission signal) to all of the subscriber devices 3-1 to 3-N, and places all of the subscriber devices 3-1 to 3-N in a standby state.

The communication stop command may be a ranging start command.

After this, in the case of the first exemplary embodiment, processing is performed under control of the exchange side device 2 to determine the phase of each channel one-by-one, in the direction from channel CH1 to channel CHN.

The phase determining processing (ranging processing) of each of the channels is similar, and explanation will be given below with regard to channel CH1, with reference to FIG. 10 to FIG. 11. In the ranging processing with regard to channel CH1, there is no communication executed between the exchange side device 2 and the subscriber devices 3-2 to 3-N for the other channels. Skew adjustment for each of the channels is carried out by the reception section 40-n of the exchange side device 2.

Figure 11:
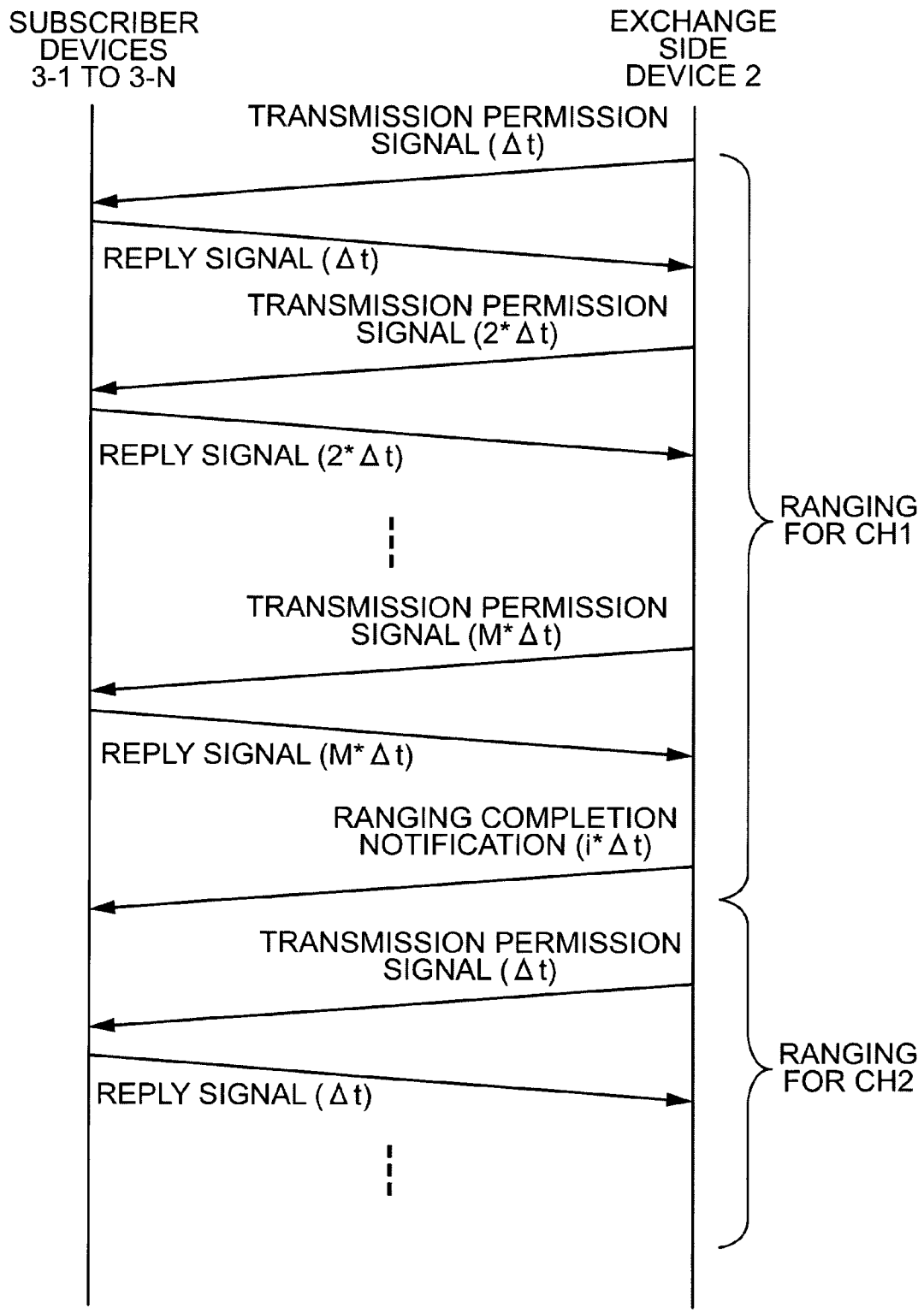
FIG. 11 is a sequence diagram used for explaining a ranging operation of the first exemplary embodiment.

(S1) In FIG. 11, the exchange side device 2 transmits the transmission permission signal toward the subscriber device 3-1. The transmission permission signal is one or more repetitions of the same sync signal, and data (phase amount data) is carried in the control signal within the sync signal for controlling the variable phase shifter 33-1 in the transmission section 30-1 of the subscriber device 3-1.

(S2) After receipt of the transmission permission signal, the subscriber device 3-1 reads out the phase amount data carried within the sync signal, sets the phase amount of the variable phase shifter 33-1, and transmits a reply signal toward the exchange side device 2. This reply signal is one or more repetitions of the same sync signal.

(S3) The exchange side device 2 attempts, using the reception section 40-1, to receive the fixed signal within the reply signal that has been transmitted from the subscriber device 3-1. Determination is made as to whether or not the reception synchronization has been achieved by determining whether or not the fixed signal can be received without error.

The operations of the above (S1) to (S3), as shown in FIG. 11, are repeated M times. More precisely, the phase amount data is incremented by Δt for each one of the repetitions. When this is being carried out, the relationship of Equation (1) is held between the number of times of repetition M, the phase step amount Δt, and the bit interval of the data signal.

$$M*\Delta t = \text{bit interval} \tag{1}$$

Multiple combinations of M and Δt exist. When M is made large, the phase amount can be accurately adjusted, however the duration for a single time of ranging increases. When M is made small, the error in the phase amount gets greater, however the duration for a single time of ranging decreases. Since such a "trade-off" relationship exits, appropriate values for M and Δt are determined according to the environment.

Figure 10:
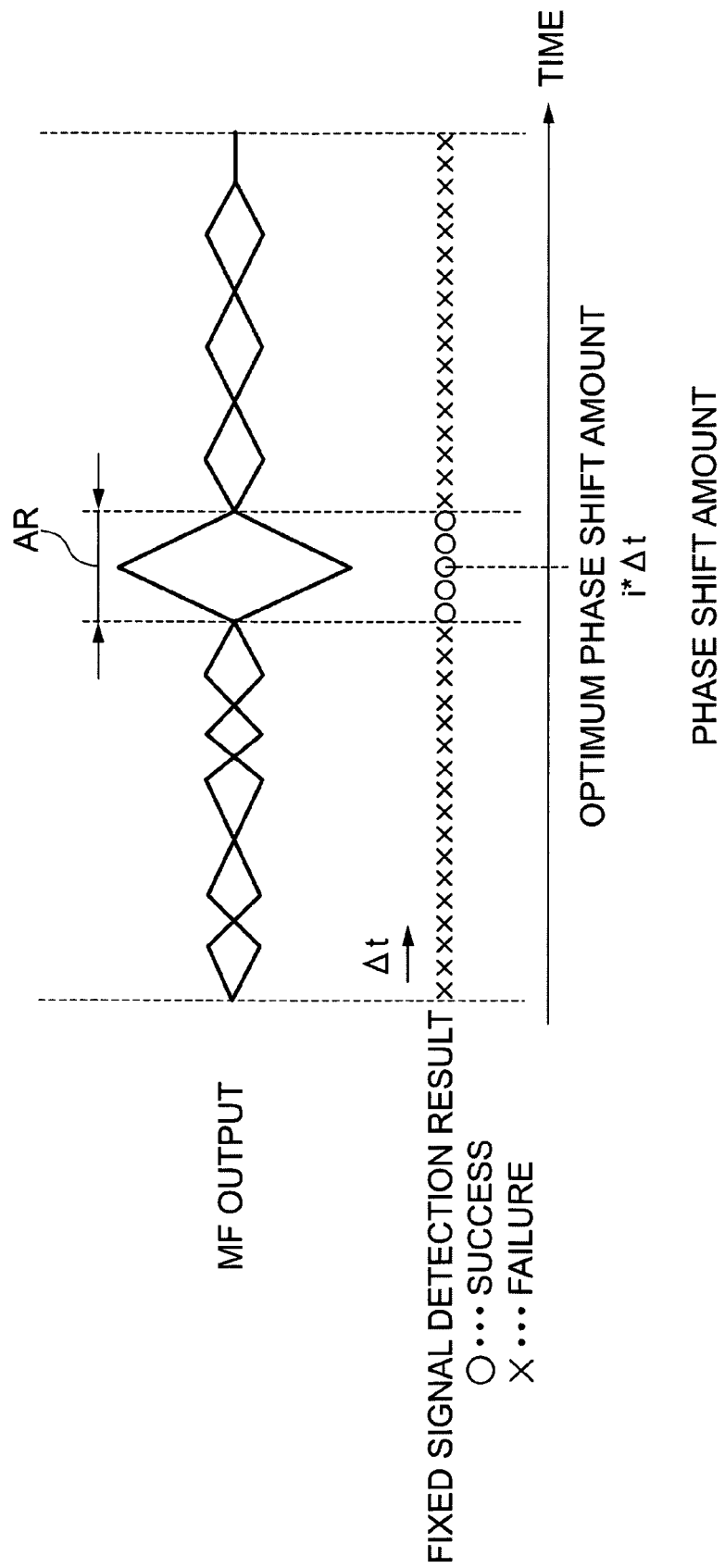
FIG. 10 is a timing chart showing an auto correlation output according to skew adjustment processing and ranging processing of the first exemplary embodiment.

After the operations of the above steps (S1) to (S3) have been repeated M times, the exchange side device 2 sets the optimum phase amount, by considering the range AR in which the fixed signal can be detected, as shown in FIG. 10, and setting the optimum phase amount to be the value i*Δt that is the center of the range AR. The exchange side device 2, as shown in FIG. 11, transmits a ranging complete notification carrying the optimum phase amount to the subscriber device 3-1, and establishes (fixes) the transmission phase of the subscriber device 3-1.

After this, as shown in FIG. 11, the exchange side device 2 transitions to ranging processing for the subscriber device 3-2 of channel CH2, and thereon in a similar manner successively executes the ranging processing for the subscriber device 3-3 to 3-N of channels CH3 to CHn.

(A-3) Effect of the First Exemplary Embodiment

As stated above, according to the first exemplary embodiment, even if there is skew present in each of the reception sections 40 within the exchange side device 2, by undertaking the procedures described above, the skew can be made to approach zero. Also, after the skew adjustment procedures of the first exemplary embodiment have been executed, assured code synchronization can be established by performing a conventional example of ranging processing.

(B) Other Exemplary Embodiments

The present invention is not limited to application to a 1-to-N communications system. Namely, there is no limitation to a PON (Passive Optical Network), and the transmission paths may be electrical transmission paths.

An example has been given in the first exemplary embodiment of a configuration that obtains a correlation output for spreading modulation employing a matched file, however application may also be made to another correlation computation configuration, such as a sliding correlation mechanism or the like.

In the first exemplary embodiment an example has been shown in which the range within which the phase is oscillated is a single bit interval ($\Delta t$ to m.$\Delta t$), however a new optimum phase amount may be determined by oscillating the phase in a narrower range. In addition, while the change in phase has been shown as gradually increasing, another change method may be employed. For example, a gradual decrease may be made. A change method based on another search method other than these two methods may also be employed.

What is claimed is:

1. A propagation delay time adjustment method for adjusting the propagation delay time occurring within a reception circuit for each channel of a center node device configuring a 1-to-N communications system in which communication is performed between the center node device and N (N being an integer of 2 or more) individual edge node devices using a Synchronous Code Division Multiplexing method,
the center node device comprising a main control section that sequentially adjusts the propagation delay times occurring within the reception circuit for each of the channels one-by-one, and each of the edge node devices comprising an auxiliary control section that controls the propagation delay time in cooperation with the main control section,
the transmission delay time adjustment method comprising:
transmission permission signal transmitting in which the main control section transmits a transmission permission signal in which a spreading code has been specified for the edge node device;
transmission controlling in which, when the transmission permission signal is received, the auxiliary control section repeatedly transmits a sync signal that has been coded using the spreading code;
reception phase controlling in which the main control section changes a reception phase of the reception circuit corresponding to the edge node device;
reception validity determining in which, for a fixed signal period in a reception signal from the edge node device, the main control section determines whether or not a signal has been validly received based on a spreading demodulation output signal from the reception circuit;
optimum reception phase determining in which the main control section determines the optimum reception phase for which valid reception can be made within an oscillated range of the reception phase; and
reception phase setting in which the main control section sets the optimum reception phase as the reception phase for the reception circuit.

2. A propagation delay time adjustment system for adjusting the propagation delay time occurring within a reception circuit for each channel of a center node device configuring a 1-to-N communications system in which communication is performed between the center node device and N (N being an integer of 2 or more) individual edge node devices using a Synchronous Code Division Multiplexing method,
the center node device comprising a main control section that sequentially adjusts the propagation delay times occurring within the reception circuit for each of the channels one-by-one, and each of the edge node devices comprising an auxiliary control section that controls the propagation delay time in cooperation with the main control section, wherein:
the main control section comprising a transmission permission signal transmission section that transmits a transmission permission signal in which a spreading code has been specified for the edge node device;
the auxiliary control section comprising a transmission control section that, when the transmission permission signal is received, repeatedly transmits a sync signal that has been coded using the spreading code;
the main control section comprising:
a reception phase control section that changes a reception phase of the reception circuit corresponding to the edge node device;
a reception validity determining section that, for a fixed signal period in a reception signal from the edge node device, determines whether or not a signal has been validly received based on a spreading demodulation output signal from the reception circuit;
an optimum reception phase determining section that determines the optimum reception phase for which valid reception can be made within an oscillated range of the reception phase; and
a reception phase setting section that sets the optimum reception phase as the reception phase for the reception circuit.

3. A propagation delay time adjustment device for adjusting the propagation delay time occurring within a reception circuit for each channel of a center node device configuring a 1-to-N communications system in which communication is performed between the center node device and N (N being an integer of 2 or more) individual edge node devices using a Synchronous Code Division Multiplexing method,
the center node device comprising a main control section that sequentially adjusts the propagation delay times occurring within the reception circuit for each of the channels one-by-one, wherein the main control section comprising:
- a transmission permission signal transmission section that transmits a transmission permission signal in which a spreading code has been specified for the edge node device;
- a reception phase control section that changes a reception phase of the reception circuit corresponding to the edge node device;
- a reception validity determining section that, for a fixed signal period in a reception signal from the edge node device, determines whether or not a signal has been validly received based on a spreading demodulation output signal from the reception circuit;
- an optimum reception phase determining section that determines the optimum reception phase for which valid reception can be made within an oscillated range of the reception phase; and
- a reception phase setting section that sets the optimum reception phase as the reception phase for the reception circuit.

4. A nontransitory storage medium stored with a propagation delay time adjustment program for adjusting the propagation delay time occurring within a reception circuit for each channel of a center node device configuring a 1-to-N communications system in which communication is performed between the center node device and N (N being an integer of 2 or more) individual edge node devices using a Synchronous Code Division Multiplexing method, the center node device comprising a main control section that sequentially adjusts the propagation delay times occurring within the reception circuit for each of the channels one-by-one, wherein the program causes the main control section to function as:
- a transmission permission signal transmission section that transmits a transmission permission signal in which a spreading code has been specified for the edge node device;
- a reception phase control section that changes a reception phase of the reception circuit corresponding to the edge node device;
- a reception validity determining section that, for a fixed signal period in a reception signal from the edge node device, determines whether or not a signal has been validly received based on a spreading demodulation output signal from the reception circuit;
- an optimum reception phase determining section that determines the optimum reception phase for which valid reception can be made within an oscillated range of the reception phase; and
- a reception phase setting section that sets the optimum reception phase as the reception phase for the reception circuit.

5. A node device in center node device of a 1-to-N communications system in which communication is performed between the center node device and N (N being an integer of 2 or more) individual edge node devices using a Synchronous Code Division Multiplexing method, the node device comprising the propagation delay time adjustment device of claim 3.

* * * * *